Nov. 25, 1924.

A. D. COLE 1,516,715

TRACTOR CONTROLLING ATTACHMENT

Filed June 25, 1921    3 Sheets-Sheet 1

Inventor
Arthur Dennis Cole
By Bradbury & Caswell
Attorneys

Nov. 25, 1924.  1,516,715
A. D. COLE
TRACTOR CONTROLLING ATTACHMENT
Filed June 25, 1921    3 Sheets-Sheet 2

Inventor
Arthur Dennis Cole
By Bradbury + Caswell
Attorneys

Inventor
Arthur Dennis Cole
By Bradbury + Caswell
Attorneys

Patented Nov. 25, 1924.

1,516,715

UNITED STATES PATENT OFFICE.

ARTHUR DENNIS COLE, OF MINNEAPOLIS, MINNESOTA.

TRACTOR CONTROLLING ATTACHMENT.

Application filed June 25, 1921. Serial No. 480,319.

*To all whom it may concern:*

Be it known that I, ARTHUR DENNIS COLE, a citizen of the United States, residing in Minneapolis, in the county of Hennepin and State of Minnesota, have invented a new and useful Tractor Controlling Attachment, of which the following is a specification.

My invention relates to improvements in tractor controlling attachments.

Its object is to provide a device of this nature, which is simple, durable and inexpensive in construction and designed to be used in connection with tractors of ordinary design without disturbing or removing any of the tractor parts.

A further object is to provide a device of this character embodying a pair of reins and associated shifter members employed in conjunction with a tractor steering mechanism, clutch lever and gear-shift lever, whereby an operator, in various positions at the rear of the tractor, may steer the same, operate the clutch and change the relation of the tractor driving gears.

With the foregoing and other objects in view, which will appear in the following description, the invention resides in the novel combination and arrangement of parts and in the details of construction hereinafter described and claimed.

Figure 1:
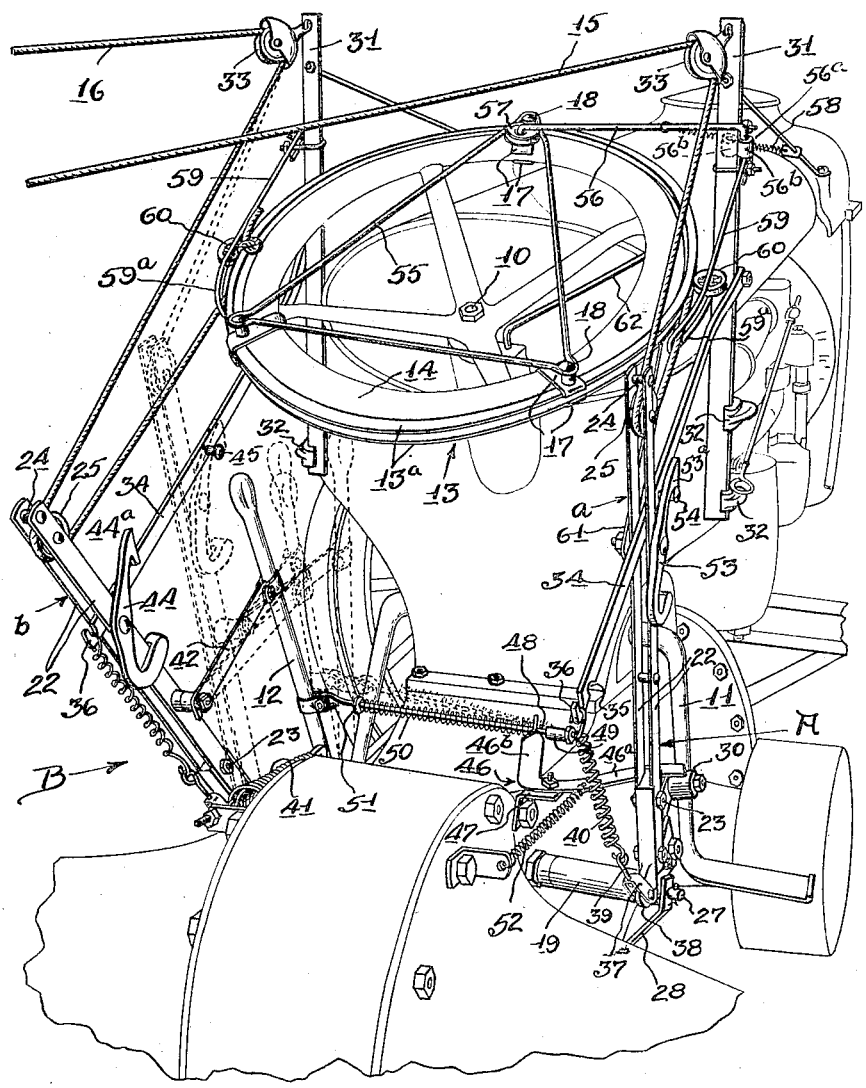
Figure 2:
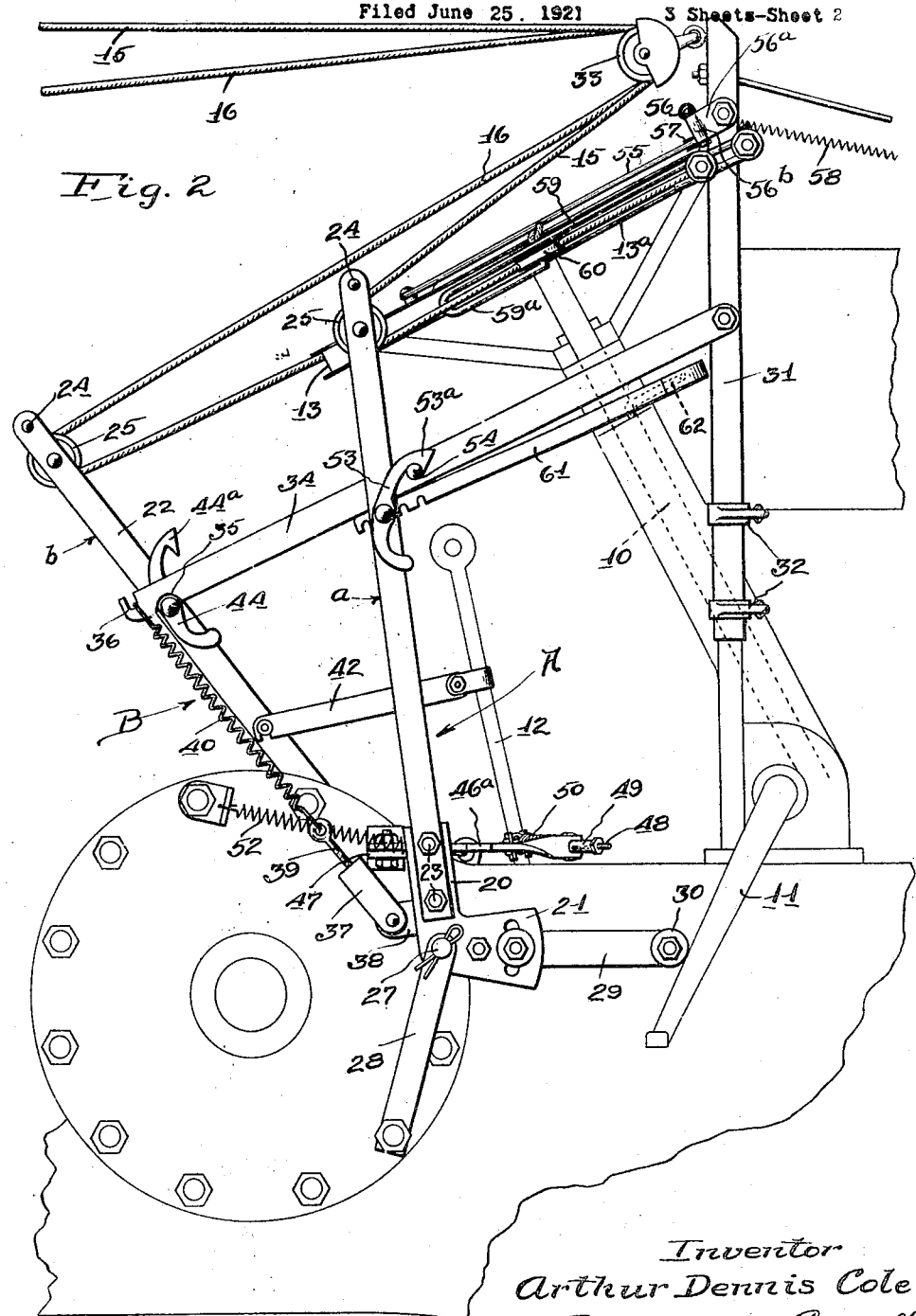
Figure 3:
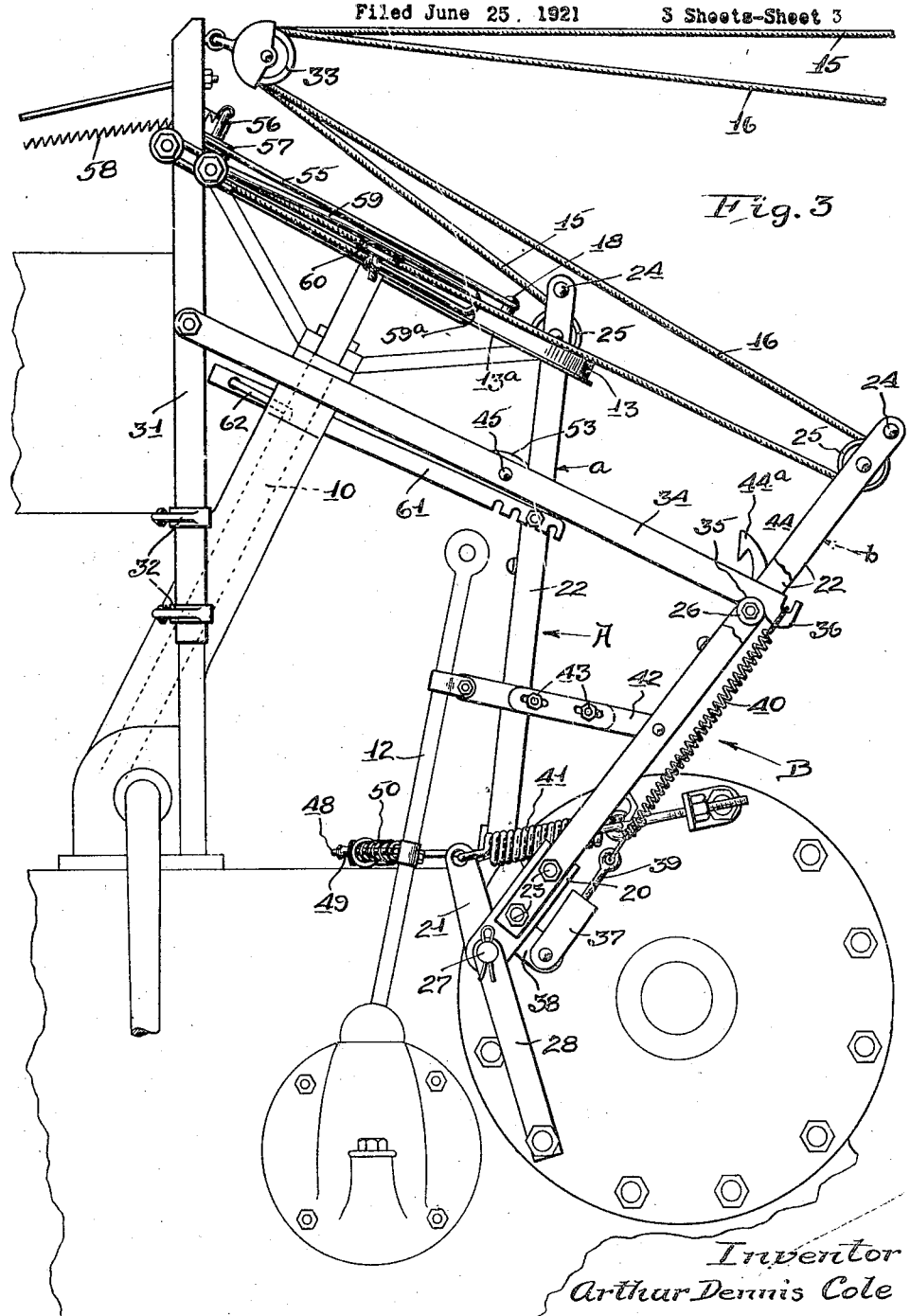

In the drawings, Fig. 1 is a perspective view of a device embodying my invention, the same being illustrated as applied to a tractor of ordinary design, and Figs. 2 and 3 are opposed side elevations thereof.

The present device is an improvement upon a similar structure pointed out in my pending application, filed February 14, 1921, and numbered 444,659. It is preferably applicable to those types of tractors embodying the usual steering post 10, clutch throw-out lever 11 and hand gear-shift lever 12.

My improvement includes a drum 13 or other turning device, said drums being preferably arranged to turn the steering post 10 of a tractor by applying the same to the usual steering wheel 14 on said post. The invention also includes two shifter members A and B, each member being respectively actuated by reins or lines 15 and 16, said reins being wound upon the drum 13 and capable of turning the steering post 10 in reverse directions. The gear-shift lever 12 is rocked back and forth by the shifter member B and sidewise from central neutral position by the shifter member A, while the clutch lever 11 of the tractor is actuated alone by said shifter member A.

The drum 13 includes upper and lower flanges 13ᵃ for retaining the turns of the reins 15 and 16 within the annular channel therebetween. This drum is attached to the steering wheel 14 by means of grips comprising opposed jaws 17 (Fig. 1) clamped firmly against the drum and rim of the steering wheel, as by means of bolts 18. The shifter members A and B are substantially the same in form, each including a bell crank consisting of a sleeve 19 with arms 20 and 21 on said sleeve. Levers *a* and *b* on the upwardly extending arms 20 each include a pair of spaced bars 22, said bars being secured at their lower ends upon opposite sides of said arms 20 by bolts 23, the upper ends of the bars being joined by spacer bolts 24. Near the upper end of each of said levers *a* and *b* is a sheave 25 journaled between the bars 22. Slightly beneath each sheave is a roller 26 also journaled between said bars. A stud 27 for each of the shifter members A and B is adapted to be threaded into a bolt receiving bore in the tractor structure and to tiltably receive the sleeve 19 of its respective shifter member. These studs 27 are supported at their ends by brackets 28 secured to the tractor frame. An extension 29 attached to the arm 21 of the shifter member A and capable of pivotal adjustment thereon is supplied at its free end with a roller 30. This roller rests in the path of the clutch operating lever 11 of the tractor and serves to depress said lever or release the same following the usual manner of an operator in releasing and engaging the clutch mechanism of the tractor. Upright frame members 31 are detachably secured to the tractor structure, preferably by means of removable clamps 32. At the upper extremity of each frame member 31, I attach a swiveled pulley 33. The reins 15 and 16, attached to and wound upon the drum 13 in opposite directions, pass rearwardly from the drum, the rein 15 being directed around the sheave 25 on the lever *a*, thence over the pulley 33 on the right frame member 31 and thence to the rear of the tractor, while the rein 16 is passed around the sheave 25 on the lever *b*, thence over the pulley 33 on the left frame member 31 and thence to the rear of the tractor. Latch bars 34, pivoted on the right and left frame members 31, extend rearwardly between the bars 22 of their respective shifter members A and B, above the rollers 26 and between said bars. Each latch bar 34 is formed at its free end with a roller receiving depression 35 and a hook 36. An inverted U-shaped link 37, pivoted at its lower ends on a lug 38 on the upright arm 20 of each shifter member, is threaded at its upper end to adjustably receive an eye-bolt 39. A spring 40 for each shifter member is stretched between the eye-bolt 39 and the hook 36 on the latch bar 34 thereof. These springs 40 serve to engage the roller receiving depressions 35 in the latch bars 34 with the rollers 26 and operate to yieldingly hold the levers $a$ and $b$ in retracted positions. The self-engaging action of the usual tractor clutch mechanism tends to return the shifter member A to retracted position and I find that I can depend upon this action of the clutch mechanism in retracting said shifter member, but it will be understood that a special retracting device may be employed, such as that used in connection with the shifter member B, which device comprises a rearwardly pulling spring 41 interposed between the arm 21 and the tractor structure, the connection between said spring and tractor structure being adjustable to vary the tension of said spring.

The lever $b$ of the shifter member B is connected through a link 42 with the gear-shift lever 12. This link has a universally pivoted and detachable connection with the lever $b$ at its rear end and a vertically adjustable and universally pivoted connection at its forward end with the gear-shift lever 12. To readily fit the various tractors, the link 42 may be lengthened or shortened by forming the same in two parts and joining them with bolts 43 passing through receiving slots (Fig. 3). Forward movement of the lever 12 by the rein 16 and rearward movement of said lever by the retracting spring 41 causes the gear-shift lever 12 to be thrown forward and backward. The spring 41 secures said gear-shift lever in rearward right and left positions, but without special provision for securing said gear-shift lever in forward right and left positions, it would be necessary to maintain a tight left rein. Such special provision is had in a latch 44 pivoted upon the lever $b$, said latch being weighted at its lower end and held so that the beveled head $44^a$ thereof will engage a pin 45 in the companion latch bar 34 and swing the latch 44 sufficiently to carry the head $44^a$ over said pin and catch the same near the extremity of the forward throw of the lever $b$. This latch 44 is released from said pin 45 by a quick, short pull upon the rein 16, followed by immediate slackening of said rein. During the short pull, the head $44^a$ of the latch is swung from the pin 45 and held from engagement therewith by the momentum of the weighted end of said latch sufficiently long to permit the retraction of the lever $b$ beyond latch engaging position. Arrangement is made for supplementing the action of the lever $b$ by the lever $a$, whereby the gear-shift lever 12 may be tilted to the right and to the left through its central neutral position. This arrangement includes a bell-crank 46 pivoted horizontally at its angle upon a bracket 47 secured to the tractor structure. The arm $46^a$ of said bell-crank reaches into the path of the lever $a$, while the other arm $46^b$ thereof reaches forwardly, as shown. A connecting rod 48, having a vertically adjustable and pivotal connection with the gear-shift lever 12 at one end, has a slidable, pivotal connection near its other end with the arm $46^b$ of said bell-crank. A stop 49, on the end of the rod 48, limits the relative movement between rod 48 and arm $46^b$ in one direction and a coiled spring 50, encircling the rod 48 and interposed between the arm $46^b$ and a collar 51 on the rod, permits of yielding movement between said arm and rod in the opposite direction. A forward throw of the lever $a$ results in compressing the spring 50. Said spring, thus compressed, causes the gear-shift lever 12 to be urged toward the left and so moves said gear-shift lever when it occupies central or neutral position. Retraction of the lever $a$ results in freeing the bell-crank 46 and permits the retracting spring 52 attached to the arm $46^a$ thereof to swing the arm $46^b$ against the stop 49 on the rod 48, thus throwing the gear-shift lever 12 to the right in neutral position. It will therefore be seen that the gear-shift lever 12 is moved to and held in forward and rear positions by the lever $b$, said gear-shift lever being shifted from right to left through neutral position by the forward throw of the lever $a$ and from left to right through neutral position by the action of the spring 52 upon the retraction of said lever $a$.

At times it is desirable to release the reins and at the same time disengage the clutch mechanism of the tractor. Without further provision than that heretofore described, this would be impossible, since the lever $a$ would be automatically returned to normal position upon the slackening of the rein 15. I pivot a latch 53 upon the lever $a$, said latch being weighted at its lower end and held so that the beveled head $53^a$ thereof will engage a pin 54 in the companion bar 34 and swing the latch 53 sufficiently to carry the head $53^a$ over said pin and catch the same near the extremity of the forward throw of the lever $a$. This latch 53 is released from said pin 54 by a quick, short pull upon the rein 15, followed by immediately slackening said rein. During the short pull, the head 53ª of the latch is swung from the pin 54 and held from engagement therewith by the momentum of the weighted end of said latch sufficiently long to permit the retraction of the lever a beyond latch engaging position.

I supply means for yieldingly securing the tractor guiding mechanism, whereby given directions of the tractor steering wheels may be maintained. A track 55, preferably triangular in form, is secured at its corners upon the steering wheel 14 by the bolts 18, which clamp the drum 13 upon said wheel. An arm 56, pivoted upon one of the frame members 31 and adapted to swing in the plane of the steering wheel, is supplied at its free end with a grooved follower wheel 57. A spring 58, stretched between said arm 56 and a point forward upon the tractor structure, yieldingly holds said follower wheel 57 in contact with the track 55. In ordinary adjustment, one angle or holding turn of the track 55 is arranged so that the tractor is directed straight ahead when the follower wheel rests in holding position therein (Fig. 1). The remaining angles or turns may be arranged in such relation as desired. The reaches of the track 55, between the holding turns, are acted upon by the follower wheel to turn the steering wheel 14 in a direction carrying the nearest angle of the track 55 into forward position. It will, therefore, be seen that the follower wheel 57, in a given angle of the track 55, will yieldingly hold the steering wheel 14 in position maintaining said relation of follower wheel and track. With the foregoing, it will be understood that the arm 56 may swing back and forth to compensate for shifting movements of the steering gear under unequalities in the road surface and that said arm will yield when the steering wheel 14 is turned in either direction by the reins 15 and 16. In plowing and for other purposes, it is sometimes desirable to direct the guiding wheels of a tractor so that the wheel in a furrow will toe in toward the land side thereof. My track 55 may be easily shifted on the steering wheel 14 to produce such inclination of the tractor wheels, or this result may be obtained by varying the reach of the arm 56. A simple means for altering the reach of said arm is illustrated in the drawings, Figs. 1 and 2. The mounting for the arm 56 upon the frame member 31 consists of a reversible clip 56ª having an eye 56ᵇ offset from the body thereof, said eye being designed to pivotally receive the downturned end of said arm. Reversing the position of the clip 56ª on the frame member 31 results in lengthening and shortening the reach of said arm 56.

Rein guides 59 are supplied at opposite sides of the drum 13. Each guide includes a yielding arm having a mounting at one end upon one of the uprights 31, the free end thereof being looped as at 59ª to receive its respective rein at a point near the drum 13 and supplied with a pulley 60, which holds the rein against slackening or buckling movements in its turn upon said drum.

A link 61, pivotally attached at its forward end to the throttle lever 62 and having an adjustable pivotal connection at its rear end with the lever a, provides for automatically throttling down the tractor when the clutch is thrown out.

In operation, the user holds the reins 15 and 16 as in driving. He may be at any convenient position, as on an implement drawn by the tractor. The gear-shift lever 12 is thrown forward and backward by pulling upon and releasing the rein 16, said lever 12 being swung to the left through neutral position by a pull upon the rein 15 and swung to the right upon releasing the rein 15. It will thus be seen that through my improved attachment, the clutch of a tractor, the gear-shift lever and the steering mechanism thereof are constantly under control of the user, who is obliged to handle but two reins or lines.

The tractor is turned to the right by pulling upon the rein 15 and slackening the rein 16, while a turn to the left is made by pulling upon the rein 16 and slackening the rein 15. The resistance of the shifter members A and B against displacement from normal retracted positions is sufficiently great to provide for the turning of the steering wheel 14 by a pull upon one rein without disturbing the normal position of its companion shifter member, when the other rein is slackened. The resistance of one shifter member against forward movement is substantially equal to that of the other member and said resistance of either member, coupled with resistance against movement in the steering mechanism, results in the displacement of one member from normal position by a pull upon its respective rein, while the other rein is held with little effort to maintain the direction of travel.

Changes in the specific form of my invention, as herein disclosed, may be made within the scope of what is claimed without departing from the spirit of my invention.

Having described my invention, what I claim as new and desire to secure by Letters Patent is:

1. The combination with a tractor having a revoluble steering element, a gear-shift lever and a clutch with actuating mechanism therefor, of an attachment comprising two shifter members, one being adjustably connected with the gear-shift lever and adapted to throw the same in given directions and the other arranged to operate the clutch mechanism, also to supplement the first member in shifting said lever, and a pair of reins for turning the revoluble steering element, each rein being further employed to actuate one of said shifter members.

2. The combination with a tractor having a revoluble steering element, a gear-shift lever and a clutch with actuating mechanism therefor, of an attachment comprising two shifter members, one to operate the gear-shift lever in given directions and the other to operate the clutch mechanism, also to supplement the first member in operating said lever, and a pair of reins for turning the revoluble steering element, each rein being further employed to actuate one of said shifter members.

3. The combination with a tractor having a revoluble steering element, changeable gearing and a single operating lever therefor tiltable in different planes, of a device including two shifter members, one for tilting said lever in one plane and the other for tilting said lever in another plane, and a pair of reins for turning the revoluble steering element, each rein being further employed to actuate one of said shifter members.

4. In a device of the class described, a pair of reins adapted to operate the steering mechanism of a tractor and a lever for each mechanism adapted to be actuated by its respective rein, one lever being adapted to throw the tractor gear-shift lever in one direction, the other lever being adapted to throw said gear-shift lever in a transverse direction, said latter lever serving also to operate the clutch of the tractor.

5. In a device of the class described, a turning member for actuating a tractor steering gear, two shifter members cooperating to shift the gear-shift lever of the tractor, one lever serving also to depress the clutch pedal of the tractor, a pair of operating reins connected with the turning member, each rein having an operable connection with one of said levers for throwing the same in one direction, yielding means for retracting said levers, yielding latches to hold said levers in retracted positions and self-tripping latches for securing said levers at selected positions in their movement against the action of said retracting means.

6. In a device of the class described, a drum adapted to be secured to a turning member in the steering gear of a tractor, a pair of reins wound upon and reaching from opposite sides of said drum, a rein guide for each rein, each guide including a guiding loop to receive the rein and a wheel designed to yieldingly grip its respective rein against the periphery of the drum and thereby prevent the buckling and loosening of the rein in its turn upon said drum when the free end thereof is slackened.

7. The combination with a tractor having guiding mechanism therefor including a revoluble element, means for turning said element to steer the tractor, a track fixed with respect to the revoluble element and formed with a holding turn therein, a yielding arm, the reach thereof being adjustable, and a follower wheel journaled on said arm and adapted to engage said track.

In testimony whereof, I have signed my my name to this specification.

ARTHUR DENNIS COLE.